US010400938B2

United States Patent
Piao

(10) Patent No.: US 10,400,938 B2
(45) Date of Patent: Sep. 3, 2019

(54) SPECIAL CONNECTION STRUCTURE FOR GIMBAL HEAD

(71) Applicant: Zhongshan Nikow Precision Industrial Co., Ltd., Guangdong (CN)

(72) Inventor: Yongjun Piao, Guangdong (CN)

(73) Assignee: ZHONGSHAN NIKOW PRECISION INDUSTRIAL CO., LTD, Guangdong Province (CN)

(*) Notice: Subject to any disclaimer, the term of this patent is extended or adjusted under 35 U.S.C. 154(b) by 0 days.

(21) Appl. No.: 15/757,900

(22) PCT Filed: Dec. 18, 2017

(86) PCT No.: PCT/CN2017/116860
§ 371 (c)(1),
(2) Date: Mar. 6, 2018

(87) PCT Pub. No.: WO2018/233244
PCT Pub. Date: Dec. 27, 2018

(65) Prior Publication Data
US 2018/0372262 A1    Dec. 27, 2018

(30) Foreign Application Priority Data

Jun. 22, 2017 (CN) .......................... 2017 1 0478717

(51) Int. Cl.
*F16M 11/12* (2006.01)
*G03B 17/56* (2006.01)

(52) U.S. Cl.
CPC .......... *F16M 11/12* (2013.01); *G03B 17/561* (2013.01); *F16M 2200/024* (2013.01)

(58) Field of Classification Search
USPC .......................................... 248/124.1
See application file for complete search history.

(56) References Cited

U.S. PATENT DOCUMENTS

| 3,467,350 A * | 9/1969 | Tyler | F16F 15/067 248/325 |
| 4,474,439 A * | 10/1984 | Brown | F16M 13/04 348/373 |
| 5,940,644 A * | 8/1999 | Putora | F16M 13/04 396/421 |
| 2004/0223078 A1* | 11/2004 | Zadok | F16M 13/04 348/375 |
| 2005/0196162 A1* | 9/2005 | Mootz | F16M 11/041 396/428 |

(Continued)

Primary Examiner — Monica E Millner
(74) Attorney, Agent, or Firm — Leason Ellis LLP

(57) ABSTRACT

A special connection structure for a gimbal head, comprising an adapter platform provided at an upper end with an adapter platform suitable for mounting and fixing a photographic apparatus and at the other end with a turn knob, an oblique column and a base. A screw for connecting a tripod pedestal is provided in a lower middle portion of the base. A positioning switch protrudes from a side face of the special connection structure. The positioning switch is opened to pitch the oblique column from 0° to 45°, 90° or 180°, and the oblique column is rotated by 180° to allow the oblique column to stand upside down between two legs of a tripod, without disassembling a gimbal head from the tripod, so that the application value of the gimbal head is improved.

2 Claims, 2 Drawing Sheets

(56) References Cited

U.S. PATENT DOCUMENTS

2005/0196163 A1* 9/2005 Mootz ................. F16M 11/041
  396/428
2016/0026072 A1* 1/2016 McElderry ........... G03B 17/561
  396/420
2017/0168375 A1* 6/2017 Lajoie ................. G03B 17/561

* cited by examiner

SPECIAL CONNECTION STRUCTURE FOR GIMBAL HEAD

CROSS-REFERENCE TO RELATED PATENT APPLICATIONS

This application is a U.S. National Phase Application under 35 U.S.C. § 371 of International Patent Application No. PCT/CN2017/116860, filed Dec. 18, 2017, and claims the priority of Chinese Application No. 201710478717.0, filed Jun. 22, 2017, which is incorporated by reference as if expressly set forth in its entirety herein.

FIELD OF THE INVENTION

The present disclosure relates to an auxiliary photographic apparatus and in particular to a special connection structure for a gimbal head.

BACKGROUND OF THE INVENTION

A tripod gimbal head is a support device for mounting and fixing a photographic apparatus. Due to design deficiencies in the prior art, for example, troubles caused by assembling and mounting on the tripod, removing from the tripod, carrying and the like, a special connection structure for a gimbal head is proposed.

SUMMARY OF THE INVENTION

The present disclosure provides a special connection structure for a gimbal head, which eliminates the need for assembling and mounting on the tripod, as well as the need for removing from the tripod, and is very convenient to carry. For this purpose, the present disclosure employs the following technical solutions.

A special connection structure for a gimbal head is provided, which includes an oblique column, an adapter platform, a turn knob and a base. The adapter platform is arranged at an upper end of the oblique column and is suitable for mounting and fixing a photographic apparatus. The turn knob is provided at the other end of the oblique column. The base is provided at a side end of an oblique column connecting sleeve and is used for supporting the oblique column. A hub is provided at an upper end of the base. A screw for connecting a tripod pedestal is provided in a lower middle portion of the base.

The special connection structure for a gimbal head includes a hub, an oblique column connecting sleeve, a positioning switch, a locking ring, a connecting screw rod and a locking knob, wherein the hub is connected to the locking knob via the oblique column connecting sleeve and the locking ring; the connecting screw rod is connected to the locking knob, and the other end of the locking knob is threadedly connected and secured to the hub; between the hub and the oblique column connecting sleeve, the positioning switch is arranged which includes a round nut, a raised step of a pin rod, a positioning groove, a hub groove, a hole and a spring; the round nut is connected to a screw for the raised step of the pin rod, while the other end of the raised step of the pin rod is in contact connection to the spring through the positioning groove, the hub groove and the hole; the raised step of the pin rod is matched with the hub groove and the positioning groove; the spring pushes the raised step of the pin rod to slide up and down within the hub groove and the positioning groove; the positioning switch is opened to pitch the oblique column from 0° to 45°, 90° or 180°, and the oblique column is rotated by 180° to allow the oblique column to stand upside down between two legs of a tripod, without needing to disassemble the gimbal head; and, the oblique column forms an angle of 90° with respect to the horizontal plane of the base.

DETAILED DESCRIPTION OF THE EMBODIMENTS

Figure 1:
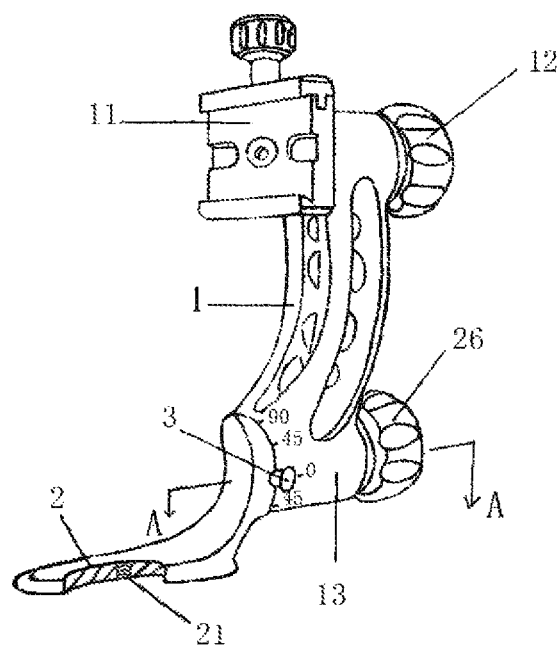
FIG. 1 is a schematic diagram of a special connection structure for a gimbal head.
Figure 2:
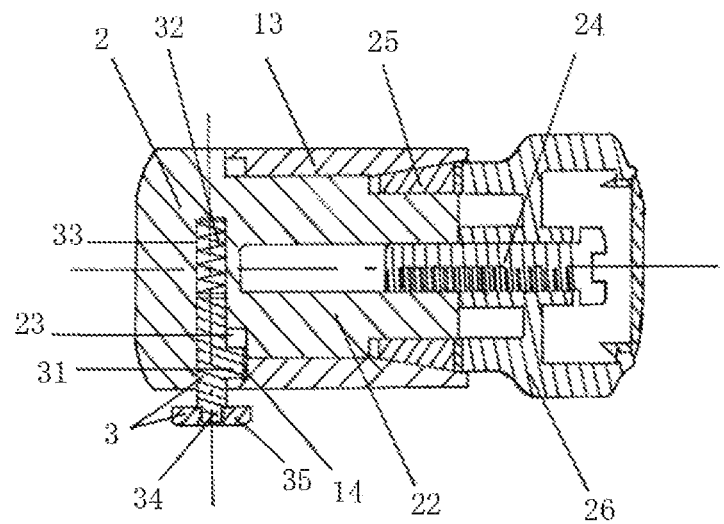
FIG. 2 is a section view of FIG. 1 taken along A-A.
Figure 3:
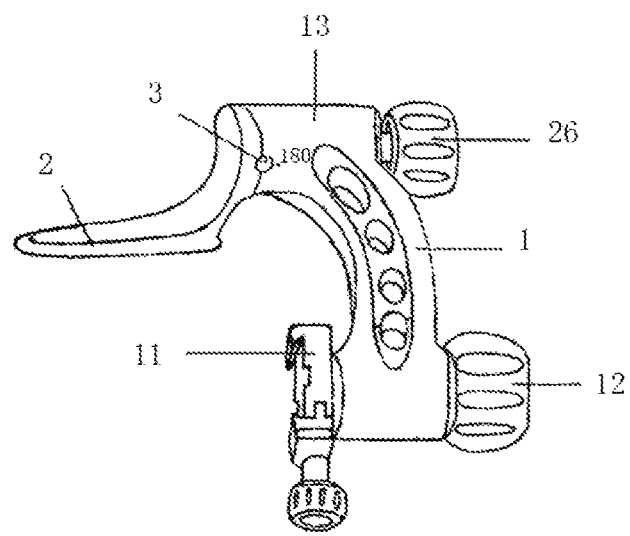
FIG. 3 is a schematic diagram of FIG. 1 with an oblique column upside down;
in which:
1: oblique column; 2: base; 3: positioning switch; 11: adapter platform; 12: turn knob; 13: oblique column connecting sleeve; 14: positioning groove; 21: tripod connecting screw; 22: hub; 23: hub groove; 24: connecting screw rod; 25: locking knob; 31: raised step of a pin rod; 32: spring; 33: hole; 34: screw; 35: round nut.

The present disclosure will be described below in detail with reference to FIGS. 1, 2 and 3.

A special connection structure for a gimbal head is provided according to the first embodiment of the present disclosure, including an oblique column 1, a base 2, a positioning switch 3, an adapter platform 11 and a turn knob 12. The adapter platform 11 is arranged at an upper end of the oblique column 1 and is suitable for mounting and fixing a photographic apparatus. The turn knob 12 is provided at the other end of the oblique column 1. The base 12 is provided at a side end of an oblique column connecting sleeve 13 and is used for supporting the oblique column 1. A hub 22 is provided at an end of the base 2. A screw 21 for connecting a tripod pedestal is provided in a lower middle portion of the base 2.

The special connection structure for a gimbal head includes a hub 22, an oblique column connecting sleeve 13, a positioning switch 3, a locking ring 25, a connecting screw rod 24 and a locking knob 26. The hub 22 is connected to the locking knob 26 through the oblique column connecting sleeve 13 and the locking ring 25. The connecting screw rod 24 is connected to the locking knob 26, and the other end of the connecting screw rod 24 is threadedly connected and secured to the hub 22. The positioning switch 3 is arranged between the base 2 and the oblique column connecting sleeve 13. The positioning switch 3 includes a round nut 35, a raised step 31 of a pin rod, a positioning groove 14, a hub groove 23, a hole 33 and a spring 32.

The round nut 35 is connected to a screw 34, while the other end of the raised step 31 of the pin rod is in contact connection to the spring 32 through the positioning groove 14, the hub groove 23 and the hole 33. The raised step 31 of the pin rod is matched with the hub groove 23 and the positioning groove 14. The spring pushes the raised step 31 of the pin rod to slide up and down within the hub groove 23 and the positioning groove 14. The positioning switch 3 is opened to pitch the oblique column 1 from 0° to 45°, 90° or 180°, and the oblique column 1 is rotated by 180° to allow the oblique column 1 to stand upside down between two legs of a tripod, without needing to disassemble the gimbal head. The oblique column 1 forms an angle of 90° with respect to the horizontal plane of the base 2.

The present embodiment has the following characteristics: the oblique column forms an angle of 90° with respect to the horizontal plane of the base; and, the positioning switch is opened to pitch the oblique column 1 from 0° to 45°, 90° or 180°, and the oblique column is rotated by 180° to allow the oblique column to stand upside down between two legs of a tripod, without needing to disassemble the gimbal head from the tripod, so that the application value of the gimbal head is improved.

The foregoing descriptions merely show specific implementations of the present disclosure, but the protection scope of the present disclosure is not limited thereto. Any variation or replacement easily conceived by those skilled in the art without paying any creative labor within the technical scope disclosed by the present disclosure shall fall into the protection scope of the present disclosure. Accordingly, the protection scope of the present disclosure shall be subject to the protection scope defined by the claims.

The invention claimed is:

1. A special connection structure for a gimbal head, comprising:
    a hub,
    an oblique column,
    an oblique column connecting sleeve,
    a positioning switch,
    a locking ring,
    a connecting screw rod and a locking knob, and
    a base, the oblique column forms an angle of 90° with respect to a horizontal plane of the base,
    wherein the positioning switch comprises a round nut, a raised step of a pin rod, a positioning groove, an hub groove, a hole and a spring; the round nut is connected to a screw for the raised step of the pin rod, while the other end of the raised step of the pin rod is in contact connection to the spring by means of the positioning groove, the hub groove and the hole; wherein the positioning switch is arranged between the hub and the oblique column connecting sleeve.

2. The special connection structure for a gimbal head according to claim 1, wherein the raised step of the pin rod is matched with the hub groove and the positioning groove; the spring is configured for pushing the raised step of the pin rod to slide up and down within the hub groove and the positioning groove; the positioning switch is configured for controlling, when opened, the oblique column to pitch from 0° to 45°, 90° or 180°.

* * * * *